United States Patent
Redman et al.

(10) Patent No.: US 10,126,999 B1
(45) Date of Patent: Nov. 13, 2018

(54) DISPLAY SCALING

(71) Applicant: Apple Inc., Cupertino, CA (US)

(72) Inventors: David J. Redman, Fremont, CA (US); Chengchung Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 15/275,313

(22) Filed: Sep. 23, 2016

(51) Int. Cl.
  *G06F 3/14* (2006.01)
  *G09G 5/00* (2006.01)
(52) U.S. Cl.
  CPC .......... *G06F 3/1446* (2013.01); *G09G 5/005* (2013.01); *G09G 2300/026* (2013.01); *G09G 2370/04* (2013.01)
(58) Field of Classification Search
  None
  See application file for complete search history.

(56) References Cited

U.S. PATENT DOCUMENTS

| 7,777,691 B1 | 8/2010 | Nimmer et al. |
| 8,966,095 B2 | 2/2015 | Mostafa et al. |
| 2015/0205630 A1 | 7/2015 | Hu et al. |
| 2016/0034241 A1 | 2/2016 | Jenks et al. |
| 2016/0321969 A1* | 11/2016 | Kambhatla ............ G09G 3/003 |

OTHER PUBLICATIONS

Saarinen, "What Do You Need to Verify in DP", https://www.unigraf.fi/blog/testing-displayport-sources-and-sinks/what-do-you-need-to-verify-in-dp, Nov. 2014.*
Altera, "DisplayPort IP Core User Guide," 2014.*
Xilinx, "Video Timing Controller v6.0," PG016, Oct. 2, 2013.*
Craig Wiley, "DisplayPort Technical Overview," IEEE, 2011.*

* cited by examiner

*Primary Examiner* — Nicholas R Wilson
(74) *Attorney, Agent, or Firm* — Womble Bond Dickinson (US) LLP

(57) ABSTRACT

Display control of a sink device is provided. The sink device has tiles forming a display and is connected to a source device via interfaces. Each interface provides a video stream to a respective tile. The source device includes a policy engine, and a GPU (graphics processing unit). The policy engine obtains link training data provided by the driver of the GPU, including information regarding a negotiated link configuration for the interfaces. The policy engine generates configuration data based on the synchronous link training data, the configuration data including a set of configurations each of which associated with a resolution of the display. The policy engine provides driving data to the GPU derived by mapping a resolution to a configuration implementation on the interfaces based on the synchronous link training data and the configuration data.

18 Claims, 3 Drawing Sheets

DISPLAY SCALING

FIELD

One aspect of the disclosure herein relates to techniques for providing display control to a display device.

BACKGROUND

Displays such as 4K displays can have hardware including multiple tiles, which means the display is physically divided down the glass. For example, in a display with 3840×2160 resolution, the display is divided down the center of the glass producing two 1920×2160 resolution displays pushed together. The two displays are blended into one logical unit using software running on a source device. To the upper layer such as an operating system running on the source device, the tiled display appears to be a single display, for example, at 3840×2160 resolution. However, for such displays, there are two separate video streams, one going to each physical display (tile). Thus, the video stream appears as two separate video streams to a driver layer. Since the display appears to the upper layer as a single display and appears to the driver layer as separate tiles, problems can arise when the driver layer implements a resolution specified at the upper layer on the display.

BRIEF DESCRIPTION OF THE DRAWINGS

The embodiments herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one. Also, in the interest of conciseness and reducing the total number of figures, a given figure may be used to illustrate the features of more than one embodiment, and not all elements in the figure may be required for a given embodiment.

DETAILED DESCRIPTION

Several embodiments are now explained with reference to the appended drawings. Whenever aspects are not explicitly defined, the embodiments are not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

An aspect of the disclosure herein aims to provide mapping between a specified resolution of a display having multiple tiles, as appearing to an upper layer application (e.g., operating system), and a physical implementation by a driver layer on hardware driving the display. In particular, the disclosure aims to control display of a sink device having a plurality of tiles forming a display. The sink device may be connected to a source device via a plurality of interfaces. Each of the interfaces may provide a video stream to a respective one of the plurality of tiles. The source device may include a policy engine and a GPU (graphics processing unit) having a driver. The policy engine may obtain synchronous link training data provided by the driver of the GPU. The synchronous link training data may include information regarding a negotiated link configuration for the plurality of interfaces. The policy engine may generate configuration data based at least in part on the synchronous link training data. The configuration data may include a set of configurations and each configuration of the set may be associated with a resolution of the display. The policy engine provides driving data to the driver of the GPU for driving the display. The driving data is derived by mapping a specified resolution to a configuration implementation on the plurality of interfaces based on the synchronous link training data and the configuration data.

By virtue of the arrangements disclosed herein, it is typically possible to provide greater display configuration flexibility when controlling a display, while providing seamless display control and minimizing display error.

Figure 1:
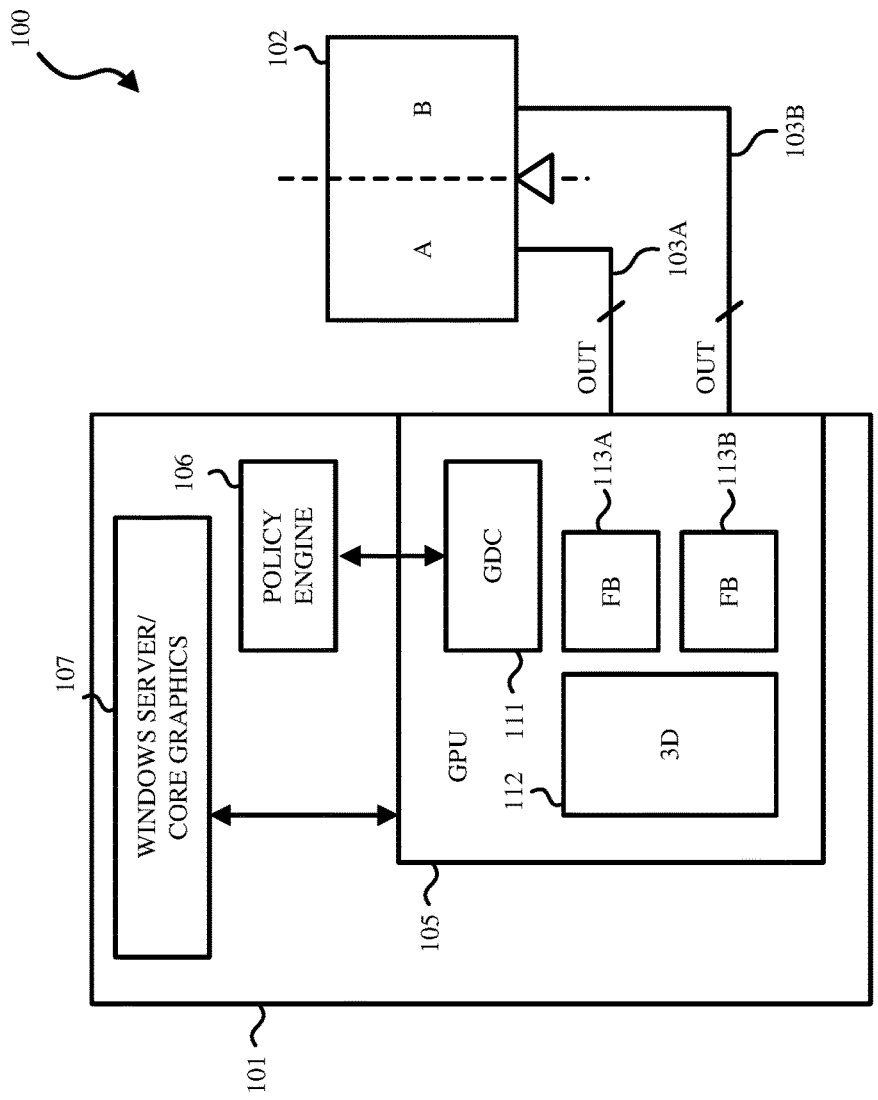
FIG. 1 is a block diagram illustrating a source device, a sink device (display), and interfaces connecting the source device and the sink device, according to an example embodiment.

FIG. 1 illustrates a system 100 including a source device 101 and a sink device 102 connected by interfaces 103A and 103B, according to an example embodiment. The source device 101 can be, for example, a computer including a GPU (graphics processing unit) 105. The computer may also include a main control unit such as a CPU (not shown), and a storage unit (not shown) including a ROM (Read Only Memory) and a RAM (Random Access Memory). These components can be connected by a bus or the like and controlled when the main control unit executes programs stored in the storage unit. The interfaces 103A and 103B can be, for example, two separate cables being copper-based or made up of optical fiber, or digital video interface (DVI) cables.

The sink device 102 can be a display device such as a monitor or television. In particular, the display device can be a 4K or 5K monitor or any other resolution monitor having hardware including multiple tiles, such as tiles A and B as shown in FIG. 1. Of course, the display is not limited to the two tiles A and B, and in other embodiments the display can have more than two tiles. The multiple tiles of the display appear as a single seamless display to a user. As an example, in a display with 3840×2160 resolution, the display is divided down the center of the glass producing two 1920×2160 resolution displays pushed together.

The source device 101 may also include upper layer applications such as Windows Server and/or Core Graphics 107 or any other upper layer applications. The upper layer applications provide a logical view of what a user sees on the display, and communicate with components of the GPU 105 so that data being provided to each of the tiles of the display 102 reflects the logical view. In particular, the GPU 105 may include a 3D processor 112 and frame buffers 113A and 113B. The 3D processor 112 is an accelerator of the GPU 105 which performs graphics rendering including 3D rendering. The frame buffers 113A and 113B provide data over the interfaces 103A and 103B to transmit video streams to the tiles A and B. The upper layer applications can communicate with both the 3D processor 112 and the frame buffers 113A and 113B to coordinate the data being transmitted to each tile so that the video displayed matches the logical view.

In one embodiment, the source device 101 may include a policy engine or policy daemon 106. The policy engine 106 is separate from the GPU 105 and communicates with a graphics display controller (GDC) 111 included in the GPU 105. The policy engine 106, through communication with the GDC 111, manages communications between the upper layer applications and the frame buffers 113A and 113B to map a display mode as intended by the upper layer applications and the physical configuration to be driven in the bottom layer (e.g., frame buffers 113A and 113B). The GDC 111 instructs the frame buffers 113A and 113B to follow specific instructions provided by the policy engine 106.

The GDC 111 also can be a control node during synchronous link training of the interfaces 103A and 103B. The GDC 111 communicates synchronous link training data to the policy engine 106 for use in mapping display configurations between upper layer applications and the driver layer, as described in more detail below in connection with FIG. 2. The synchronous link training data includes valid lanes for communicating data on interfaces 103A and 103B and corresponding bit rates for each valid lane. For example, the synchronous link training data may indicate a number of valid lane configurations on each interface with corresponding bit rates for each valid lane configuration. Each of interfaces 103A and 103B may have multiple lanes having the same or different bit rates for transferring data.

Each of the frame buffers represents a logical tile. The driver of the GPU 105 provides information regarding the frame buffers (e.g., frame buffers 113A and 113B), and all the resources required by the frame buffers for taking a surface (display configuration) and sending it through a number of ports of the frame buffers for one logical tile. Using the synchronous link training data and the information provided by the frame buffers, the policy engine 106 may determine for each link what display configuration can be tiled together on the display.

In one embodiment, one of the frame buffers 113A and 113B is utilized to feed a single surface (e.g., a 5k×3k configuration) to two ports. When switching between resolutions (e.g., from 5k×3k to 1920×1080), the single frame buffer is utilized and the single surface can be fed to just one port.

Furthermore, the GDC 111 may provide the physical configuration indicating whether the frame buffer represents a single tile going to a single endpoint or represents one tile going to multiple endpoints. This is communicated by the GDC 111 to the policy engine 106. Using the foregoing physical configuration, the policy engine 106 can describe what the driver of the GPU needs to translate into what the hardware requires to physically implement the intended configuration. The policy engine 106 may inform the driver of the GPU of the intent of sending 2 or 1 tile down one stream (e.g., the stream previously negotiated) so that the frame buffers can configure their hardware appropriately without having to make the decision. The same data used in the synchronous link training can be used here. Since each of the links is discrete, when switching between resolutions there may be different configurations on the wire. If a first cable only trained at two lanes, and the system switches between resolutions, the same information is provided that this is a two lane configuration. Each of the decision making points (i.e., resolutions) includes everything about the link as well (which is derived by synchronous link training).

Both the link training data and the configuration data can be fed down through the GDC 111 into their implementations to drive the data for intended display. In some embodiments, the implementation can switch between multiple cables and multiple streams down a single cable. In these embodiments, a change in configuration can be necessary for performing the implementation change. This is performed by providing mapping between the higher level requests and the intent on the back end.

Mapping may be performed by the policy engine 106 using an algorithm. The policy engine 106 may listen for incoming hotplugs to gather data. The policy engine 106 may have datasets that can understand the physics of the display such as how many cables feed into the display, various topology information, etc. This information can be fed to the algorithm to determine decision points of the configurations. The policy engine may use the physical information of the display along with heuristics and predefined human interface policies (e.g., instructed preferences on how the display should look) for mapping configurations between the upper layer applications and the driver layer.

In some embodiments, when a display cable is plugged in to the source device 101, a hot plug notification informs the hardware that something has been inserted. Software provided on the source device can read a VESA (Video Electronics Standard Association) standard called EDID (Extended Display Identification Data). Each display vendor embeds a TCON (timing controller) which includes the EDID data. EDID tells the host who made the panel, the product number and information about what timings the panel can receive. For example, for a 5K display, panel A may indicate capabilities of 1080p and 2560×2880. And panel B may indicate a capability of only 2560×2880. The foregoing indications are what the EDID provide when read at a very high level. A list of configurations is then compared to the A and B EDID data to find matches. Since 1080p only shows up on one side, it is determined that configuration 1 is 1080p and is a single link because it's only on one side. With this information, the source device knows that it should train one cable (providing a configuration with just one cable). Furthermore, in the above example, a configuration may be found that matches, where both sides have capabilities of 2560×2880. It is therefore determined that the two sides are left and right halves of the same unit. Using the EDID, the policy engine can build a configuration set to present to the upper application layer. For example, the policy engine can build a configuration that is 5k×3k dual link.

The foregoing description is a generic solution to mapping. The display provides what resolutions it is capable of displaying. The EDID does not instruct how to tile, but rather simply informs that it has a tile. When the EDID inform that they have two numbers indicating that the two tiles are part of the same physical enclosure, the policy engine is the brains to aggregate the tiles together so that B does not cross over with A and A does not cross over with B (i.e., wrong sides of the display).

The following description provides example configuration sets and example specific implementations.

In one example, the configuration set can be:
1) 640×480
2) 1920×1080 (1080p)
3) 3840×2160 (4k)

For each of these configurations, there is potentially a different physical layer configuration at the driver layer. If 640×480 is selected, the driver of the GPU can resolve down to a single link driving at a lowest bit rate (which was confirmed as working because of the synchronous link training). This allows for a single stream video to be transmitted down one interface, and the display fills the display from the single video stream. If 1920×1080 is selected, then the same thing happens as above where a single stream video is transmitted down one interface, and the display scales the video stream to fit the display.

In another example, for a 5k resolution monitor having two 2560×2880 tiles pushed together to form 5k×3k display, the configuration set can be:
1) 1920×1080—single link
2) 3840×2160—single link
3) 4096×2304 at 10 bits—dual link
4) 5k×3k at 60 bits—dual link In this example, the configuration set can also be:
1) 1920×1080—single link
2) 3840×2160—single link
3) 4096×2304 at 8 bits—single link
4) 4096×2304 at 10 bits—dual link
5) 5k×3k at 60 bits—dual link In this configuration set, since configurations 3 and 4 have identical resolutions, the resolutions cannot be used to determine anything with respect to the link. Configurations 3) and 4) switch between a single link and a dual link because the deeper color (10 bits versus 8 bits) requires dual cables. The decision cannot be made by the upper layer applications because there is an ambiguity they cannot resolve. Nothing in the user interface allows a user to choose which bit depth to use or whether to prefer a dual- or single-link connection.

Since the upper layer cannot differentiate the bit depths, the policy engine may decide which bit depth to implement. The policy engine can make this decision based on a scanout bit depth of the frame buffers and the bit depth available on the display hardware. For example, the policy engine may select configuration 4) having the higher bit depth if the frame buffer scans out at 10 bits per pixel and two cables are connected to the display. By selecting the configuration 4), the policy engine has mapped the intention of the upper layer applications to the actual physical configuration implementation, without the upper layer applications recognizing any change.

In some embodiments, the sink device (display) may include a programmable TCON (not shown). When a resolution is selected, the frame buffer driver calls up to the policy engine to ask how to implement the selected resolution. In response, the policy engine may provide the frame buffer with a configuration telling the frame buffer how to drive it. In between the back and forth between the frame buffers and the policy engine, the physical configuration of the TCON can be changed to handle the selected resolution. Typically, most displays have built-in TCONs in scalars which automatically detect the resolution that is being driven. This costs money in resources spent on the silicon required to enable the TCON to automatically detect the resolution being driven. By having a programmable TCON, it is possible to save money in manufacturing costs.

In one embodiment, the source device 101 is a DisplayPort source device and the sink device 102 is a DisplayPort sink device. In another embodiment, the interfaces 103A and 103B use a Thunderbolt protocol.

Figure 2:
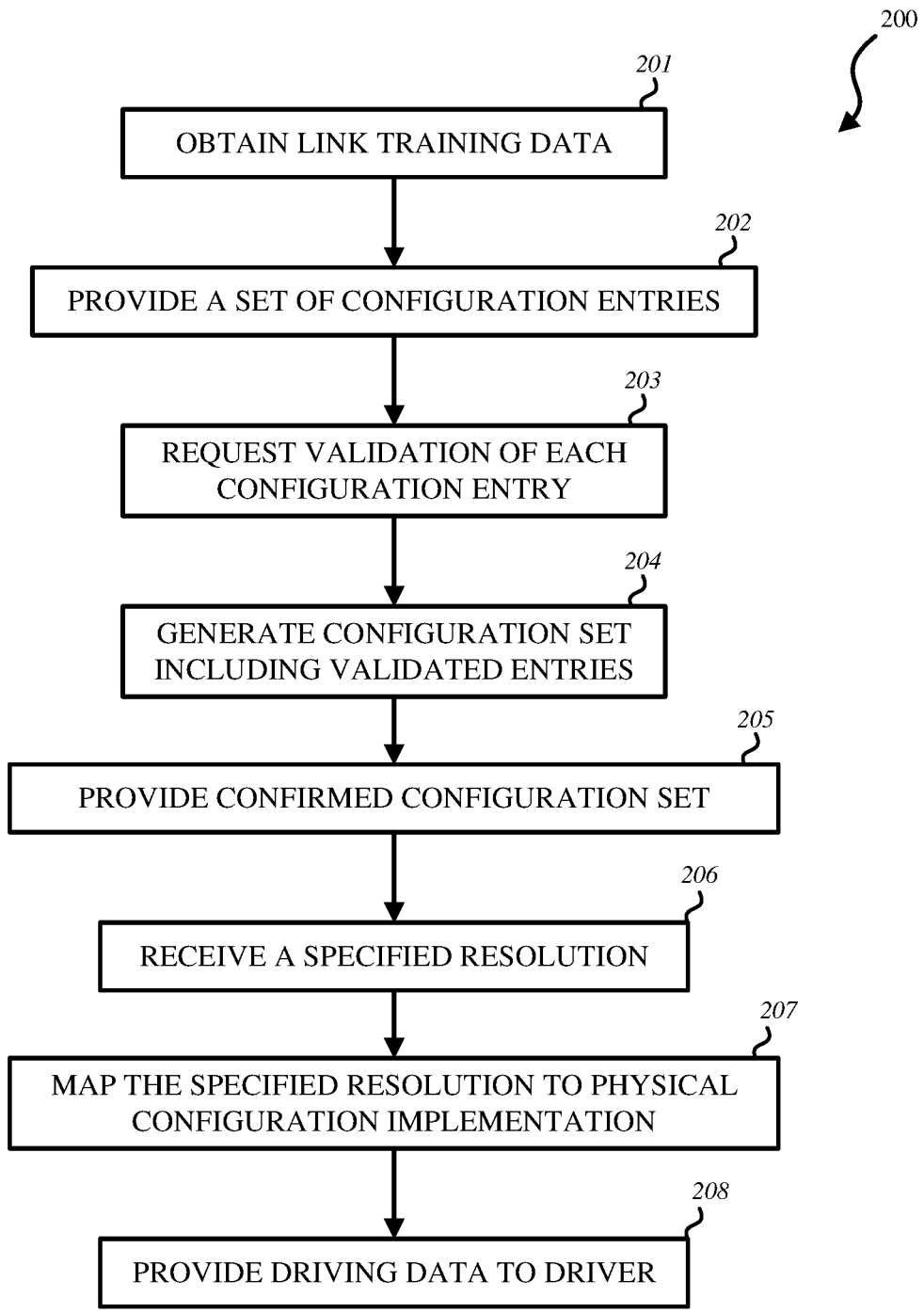
FIG. 2 illustrates a flow diagram of an example process for controlling display on the sink device of FIG. 1.

FIG. 2 illustrates a flow diagram of an example process for controlling display of a sink device (e.g., sink device 102). The sink device has a plurality of tiles forming a display and is connected to a source device (e.g., source device 101) via a plurality of interfaces (e.g., interfaces 103A and 103B). Each interface provides a video stream to a respective one of the plurality of tiles. The source device includes a policy engine (e.g., policy engine 106) and a GPU (e.g., GPU 105) having a driver. The following embodiments may be described as a process 200, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Process 200 may be performed by processing logic that includes hardware (e.g. circuitry, dedicated logic, etc.), software (e.g., embodied on a non-transitory computer readable medium), or a combination thereof. In one example embodiment, process 200 is executed by a policy engine (e.g., policy engine 106) and a software driver of a GPU (e.g., GPU 105) executing on a CPU of the source device.

Referring to FIG. 2, at block 201, the policy engine obtains synchronous link training data provided by the driver of the GPU. The synchronous link training data includes information regarding a negotiated link configuration for the plurality of interfaces. After the driver of the GPU receives and processes a hotplug when the sink device is connected to the source device, an initial link training is performed. The synchronous link training data is obtained from this initial link training.

At block 202, the policy engine provides a first set of configuration entries to the driver of the GPU. The first set of configuration entries includes a number of different configurations representing a number of desired behaviors of the display. Each configuration entry includes a resolution and link configuration of a single- or dual-link. For example, if a desired behavior is switching the display from 1080p to 5K, the set of configuration entries may include a configuration entry for the 1080p resolution with single-link and a configuration entry for the 5K resolution with dual-link.

At block 203, the policy engine requests that the driver of the GPU validate each configuration entry included in the first set of configuration entries. The policy engine confirms whether each configuration of the second set of configuration entries is performable by the driver of the GPU. The policy engine makes this confirmation by asking the driver if the hardware can perform the certain configuration. The driver of the GPU determines whether the hardware can perform the certain configuration using the synchronous link training data. Configurations which cannot be performed by the hardware are removed from the set of configuration entries. In the above example, if the driver of the GPU determines that the hardware cannot provide 5K resolution or the link training did not provide enough links, then the configuration for 5K resolution would be removed from the set of configuration entries. This provides the advantageous effect of providing only achievable configurations to a user of the upper layer applications.

At block 204, the policy engine generates a second set of configuration entries including the configuration entries validated at block 203, and requests that resources be reserved for the valid configurations. At block 205, the policy engine provides the second set of configuration entries to the upper layer applications (e.g., Windows Server and/or Core Graphics 107). By virtue of blocks 201 to 206, the policy engine generates configuration data based at least in part on the synchronous link training data.

At block 206, the policy engine receives a specified resolution from the upper layer applications. The specified resolution is a display mode selected by a user from the configuration set which is presented to the user by the upper layer applications.

At block 207, the policy engine maps the specified resolution to a configuration implementation on the plurality of interfaces using the synchronous link training data and the configuration data. In particular, the driver of the GPU calls a modeset callback to use the selected display mode for the link configuration and provide mapping between the frame buffers and link layer mappings. For facilitating mapping, the driver of the GPU provides the following input values in a first argument of the callback: (i) a frame buffer index, (ii) an upper layer application index for the display mode, (iii) a scanout buffer bit depth per channel, and (iv) a detailed timing. The modeset is called twice: the first modeset before the display link goes down and the second modeset when the display link is down. Between the modeset calls, the policy engine can evaluate the recommended modeset along with the display hardware capabilities and determine if TCON operations should be performed. The second modeset call specifies the actual timing and link configuration used for the display, when the link comes back up. In one example, the display may support a different bit depth than is requested for the frontend (scanout buffer) in the first modeset call. In another example, if the TCON scaling is enabled (and non-trivial), then the resolution specified for the second modeset may compensate for the scaling. Between the first modeset call and the second modeset call, the policy engine can, for example, program the TCON of the display or download scalars.

At block 208, the policy engine provides driving data to the driver of the GPU for driving the display in accordance with the mapping performed at block 207.

In some embodiments, at blocks 201 to 208, driver software for the source device uses an application program interface (API) to configure the link between the source device and the sink device. As one example, an API may include data relating to one or more link configurations, including a number of configurations that are currently considered valid and a memory allocation of the link configuration data. As another example, an API may include a command to prepare a valid link configuration, including a list of verified entries. As a further example, an API may include a command to reserve resources for a link configuration that has been validated, a command to release the resources and a command to set the link configuration parameters.

Figure 3:
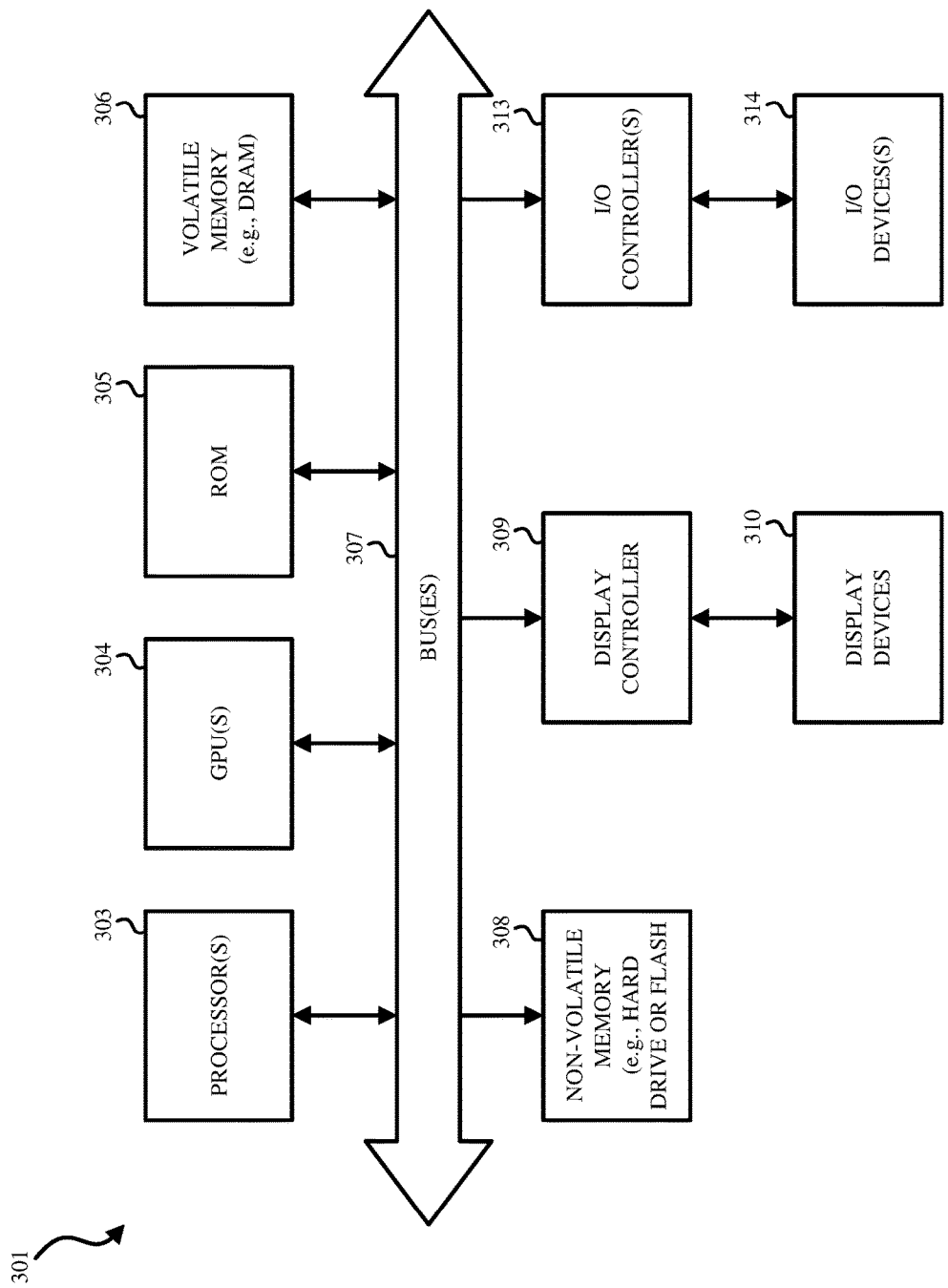
FIG. 3 illustrates a block diagram for explaining a data processing system which can be used with one or more embodiments described herein.

Referring to FIG. 3, FIG. 3 is a block diagram for explaining an example of a data processing system hardware which may be used with any of the embodiments described herein. This data processing system can represent a general purpose computer system or a special purpose computer system. Note that while FIG. 3 illustrates the various components of a data processing system that may be incorporated into a mobile or handheld device, it is not intended to represent any particular architecture or manner of interconnecting the components as such details are not germane to the embodiments herein. It will also be appreciated that other types of data processing systems that have fewer components than shown or more components than shown in FIG. 3 can also be used.

As shown in FIG. 3, the data processing system 301 includes one or more buses 307 that serve to interconnect the various components of the system. One or more processors 303 and one or more graphics processing units (GPUs) are coupled to each other through the one or more buses 307 as is known in the art. The processors may be microprocessors or special purpose processors, such as a processor created through an Application Specific Integrated Circuit (ASIC). Read Only Memory (ROM) 305, volatile memory 306 and non-volatile memory 308 are coupled to the one or more buses 307 using techniques known in the art. Volatile memory 306 may be DRAM. Non-volatile memory 308 may be a hard disk drive or a flash memory or a magnetic optical drive or magnetic memory or an optical drive or other types of memory systems that maintain data even after power is removed from the system. In one embodiment, the processor 303 retrieves computer program instructions (e.g., policy engine 106 and/or upper layer applications 107) stored in a machine readable storage medium such as the ROM 305, the volatile memory 306 or the non-volatile memory 308 or a combination of those memories and executes those instructions to perform operations described herein. A display controller 309 is coupled to the one or more buses 307 in order to receive display data to be displayed on display device(s) 310. In other embodiments, the display controller 309 is coupled directly to GPU 304. The display device(s) 310 can include an integrated touch input to provide a touch screen. The data processing system can also include one or more input/output (I/O) controllers 313 which provide interfaces for one or more I/O devices 314, such as one or more mice, touch screens, touch pads, joysticks, and other input devices including those known in the art and output devices (e.g. speakers). The input/output devices 314 are coupled through one or more I/O controllers 313 as is known in the art.

While FIG. 3 shows that the non-volatile memory 308 and the volatile memory 306 are coupled to the one or more buses directly rather than through a network interface, it will be appreciated that the embodiments disclosed herein can utilize non-volatile memory that is remote from the system, such as a network storage device which is coupled to the data processing system through a network interface such as a modem or Ethernet interface. The buses 307 can be connected to each other through various bridges, controllers and/or adapters as is well known in the art. In one embodiment the I/O controller 313 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) can be coupled to the bus(es) 307. The network device(s) can be wired network devices (e.g., Ethernet) or wireless network devices (e.g., WI-FI, Bluetooth).

In the embodiment of the source device in the form of a computer, data processing system 301 may be a computer that is generally portable (such as laptop, notebook, tablet, and handheld computers), as well as a computer that is generally used in one place (such as conventional desktop computers, workstations, and servers).

The source device may also take the form of other types of devices, such as mobile telephones, media players, personal data organizers, handheld game platforms, cameras, and/or combinations of such devices. For instance, the DisplayPort source device may be provided in the form of a handheld electronic device that includes various functionalities (such as the ability to take pictures, make telephone calls, access the Internet, communicate via email, record audio and/or video, listen to music, play games, connect to wireless networks, and so forth).

In another embodiment, the source device may also be provided in the form of a portable multi-function tablet computing device. In certain embodiments, the tablet computing device may provide the functionality of media player, a web browser, a cellular phone, a gaming platform, a personal data organizer, and so forth.

It will be apparent from this description that various embodiments may be embodied, at least in part, in software. That is, the techniques may be carried out in a data processing system in response to its processor executing a sequence of instructions contained in a storage medium, such as a non-transitory machine-readable storage medium (e.g. DRAM or flash memory). In various embodiments, hardwired circuitry may be used in combination with software instructions to implement the techniques described herein. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

In the description, certain terminology is used to describe features of various embodiments. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

While certain embodiments have been described and shown in the accompanying drawings, it is to be understood that such embodiments are merely illustrative of and not restrictive, and the embodiments are not limited to the specific constructions and arrangements shown and described, since various other modifications may occur to those of ordinary skill in the art. The description is thus to be regarded as illustrative instead of limiting.

The invention claimed is:

1. A method for controlling display of a sink device, the sink device having a plurality of tiles forming a display and being connected to a source device via a plurality of interfaces, each interface providing a video stream to a respective one of the plurality of tiles, the source device comprising:
   a policy engine; and
   a GPU (graphics processing unit) having a driver,
   the method comprising:
   obtaining, by the policy engine, synchronous link training data provided by the driver of the GPU, the synchronous link training data including information regarding a negotiated link configuration for the plurality of interfaces;
   generating, by the policy engine, configuration data based at least in part on the synchronous link training data, the configuration data including a first set of configurations, each configuration of the set being associated with a resolution of the display;
   providing, by the policy engine, the first set of configurations to the driver of the GPU;
   requesting, by the policy engine, the driver of the GPU to validate each entry of the first set of configurations;
   generating, by the policy engine, a second set of configurations that include one or more validated configuration entries of the first set that have been validated by the GPU;
   providing the second set of configurations including the one or more validated configuration entries to an upper layer application; and
   providing, by the policy engine, driving data to the driver of the GPU for driving the display, the driving data being derived by mapping a specified resolution to a configuration implementation on the plurality of interfaces based on the synchronous link training data and the configuration data.

2. The method of claim 1 wherein each validated configuration entry requires a single link or dual links, and the driver of the GPU controls a frame buffer to send a surface over one port or two ports depending on the specified resolution.

3. The method of claim 1 wherein the sink device comprises a basic TCON which is programmable by the source device.

4. The method of claim 1 wherein in a case where two configuration entries of the first set of configurations are associated with the same resolution but different bit depths, the policy engine selects one of the bit depths based on the synchronous link training data and the configuration data.

5. The method of claim 1 wherein the mapping is based on at least one of physical information regarding the display gathered by the policy engine, heuristics and predefined human interface policies.

6. The method of claim 1 wherein the source device further comprises a CPU (central processing unit), the driver of the GPU being executed on the CPU, and wherein the driver uses an application programming interface (API) comprising a command for preparing a link training configuration, a command for binding configuration resources, a command for releasing configuration resources and a command to set configuration resources.

7. A source device for controlling display of a sink device, the sink device having a plurality of tiles forming a display and being connected to the source device via a plurality of interfaces, each interface providing a video stream to a respective one of the plurality of tiles, the source device comprising:
   a policy engine;
   a GPU (graphics processing unit) having a driver; and
   a CPU (central processing unit) on which the driver and the policy engine are executed to:
   obtain, by the policy engine, synchronous link training data provided by the driver of the GPU, the synchronous link training data including information regarding a negotiated link configuration for the plurality of interfaces;
   generate, by the policy engine, configuration data based at least in part on the synchronous link training data, the configuration data including a first set of configurations, each configuration of the set being associated with a resolution of the display;
   provide, by the policy engine, the first set of configurations to the driver of the GPU;
   request, by the policy engine, the driver of the GPU to validate each entry of the first set of configurations;
   generate, by the policy engine, a second set of configurations that include one or more validated configuration entries of the first set that have been validated by the GPU;
   provide the second set of configurations including the one or more validated configuration entries to an upper layer application; and
   provide, by the policy engine, driving data to the driver of the GPU for driving the display, the driving data being derived by mapping a specified resolution to a configuration implementation on the plurality of interfaces based on the synchronous link training data and the configuration data.

8. The source device of claim 7 wherein each configuration entry requires a single link or dual links, and the driver of the GPU controls a frame buffer to send a surface over one port or two ports depending on the specified resolution.

9. The source device of claim 7 wherein the sink device comprises a basic TCON which is programmable by the source device.

10. The source device of claim 7 wherein in a case where two configuration entries of the first set of configurations are associated with the same resolution but different bit depths, the policy engine selects one of the bit depths based on the synchronous link training data and the configuration data.

11. The source device of claim 7 wherein the mapping is based on at least one of physical information regarding the display gathered by the policy engine, heuristics and predefined human interface policies.

12. The source device of claim 7 wherein the driver uses an application programming interface (API) comprising a command for preparing a link training configuration, a command for binding configuration resources, a command for releasing configuration resources and a command to set configuration resources.

13. A non-transitory computer-readable storage medium storing executable program instructions which when executed by a data processing system cause the data processing system to perform method for controlling display of a sink device, the sink device having a plurality of tiles forming a display and being connected to a source device via a plurality of interfaces, each interface providing a video stream to a respective one of the plurality of tiles, the source device comprising a policy engine; and a GPU (graphics processing unit) having a driver, the method comprising:

obtaining, by the policy engine, synchronous link training data provided by the driver of the GPU, the synchronous link training data including information regarding a negotiated link configuration for the plurality of interfaces;

generating, by the policy engine, configuration data based at least in part on the synchronous link training data, the configuration data including a first set of configurations, each configuration of the set being associated with a resolution of the display;

providing, by the policy engine, the first set of configurations to the driver of the GPU;

requesting, by the policy engine, the driver of the GPU to validate each entry of the first set of configurations;

generating, by the policy engine, a second set of configurations that include one or more validated configuration entries of the first set that have been validated by the GPU;

providing the second set of configurations including the one or more validated configuration entries to an upper layer application; and providing, by the policy engine, driving data to the driver of the GPU for driving the display, the driving data being derived by mapping a specified resolution to a configuration implementation on the plurality of interfaces based on the synchronous link training data and the configuration data.

14. The non-transitory computer readable storage medium of claim 13 wherein each configuration entry requires a single link or dual links, and the driver of the GPU controls a frame buffer to send a surface over one port or two ports depending on the specified resolution.

15. The non-transitory computer-readable storage medium of claim 13 wherein the sink device comprises a basic TCON which is programmable by the source device.

16. The non-transitory computer-readable storage medium of claim 13 wherein the in a case where two configuration entries of the first set of configurations are associated with the same resolution but different bit depths, the policy engine selects one of the bit depths based on the synchronous link training data and the configuration data.

17. The non-transitory computer-readable storage medium of claim 13 wherein the mapping is based on at least one of physical information regarding the display gathered by the policy engine, heuristics and predefined human interface policies.

18. The non-transitory computer-readable storage medium of claim 13 wherein the source device comprises a GPU and a CPU, the GPU having a driver being executed on the CPU, and wherein the driver uses an application programming interface (API) comprising a command for preparing a link training configuration, a command for binding configuration resources, a command for releasing configuration resources and a command to set configuration resources.

* * * * *